…

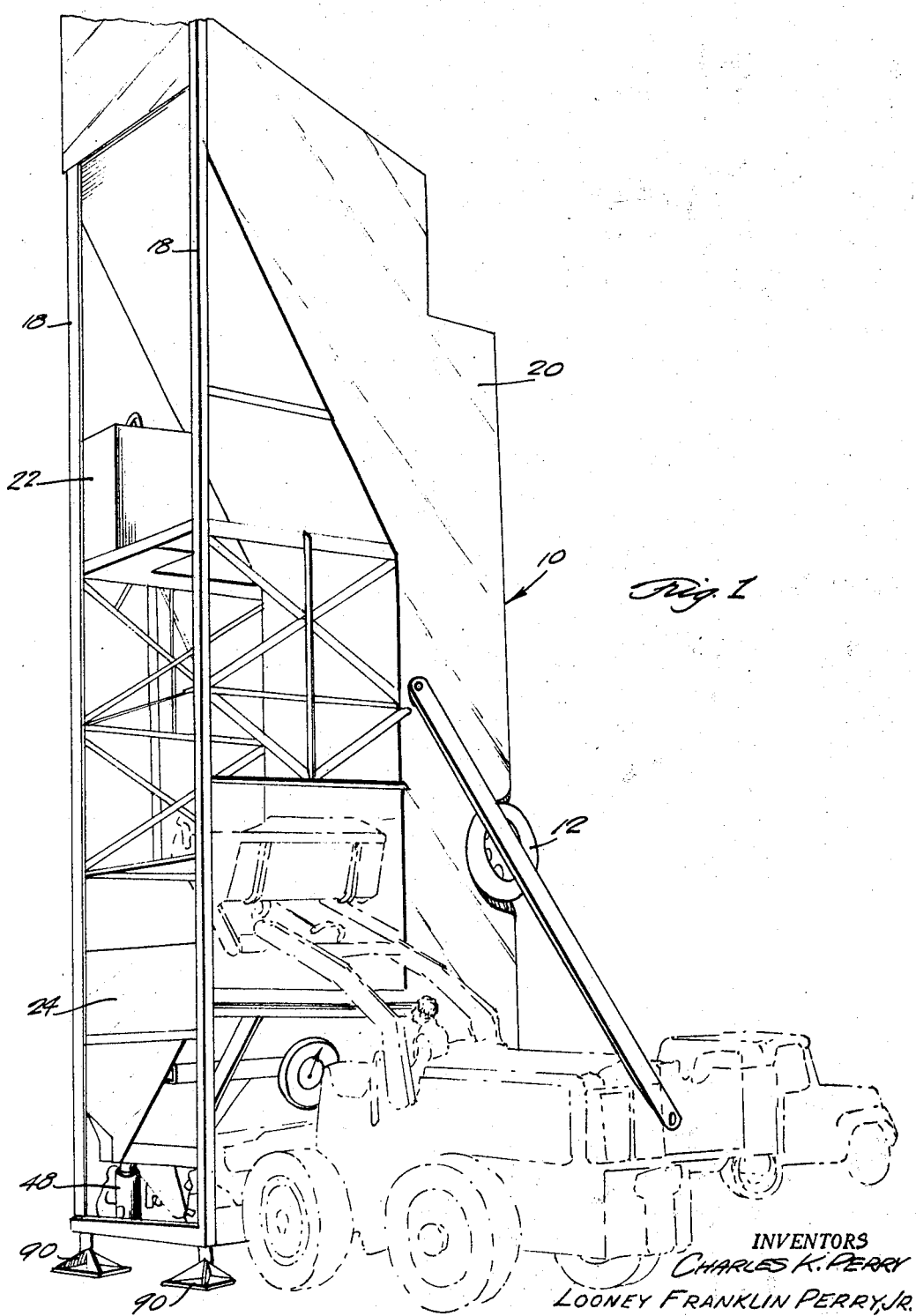

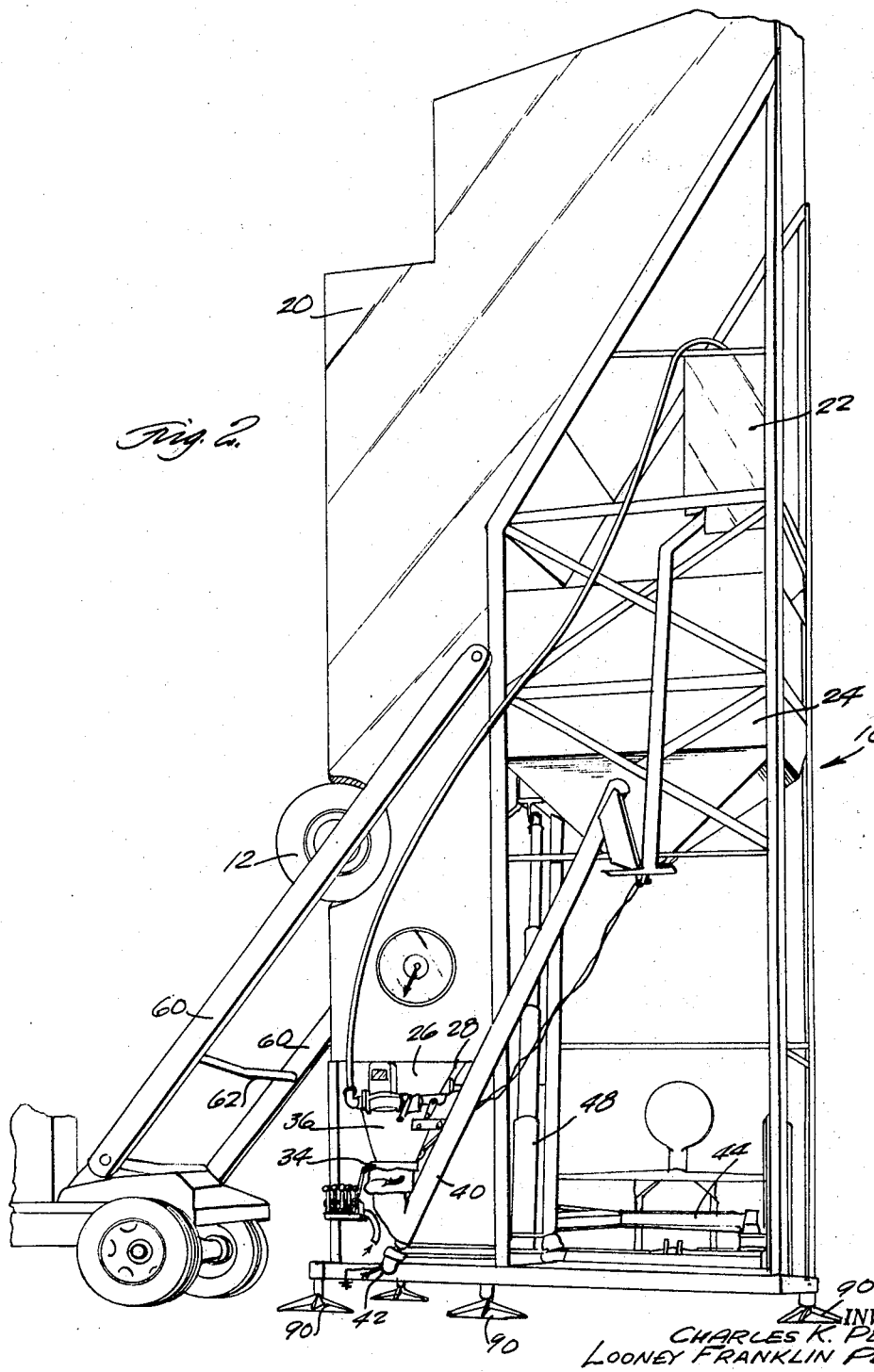

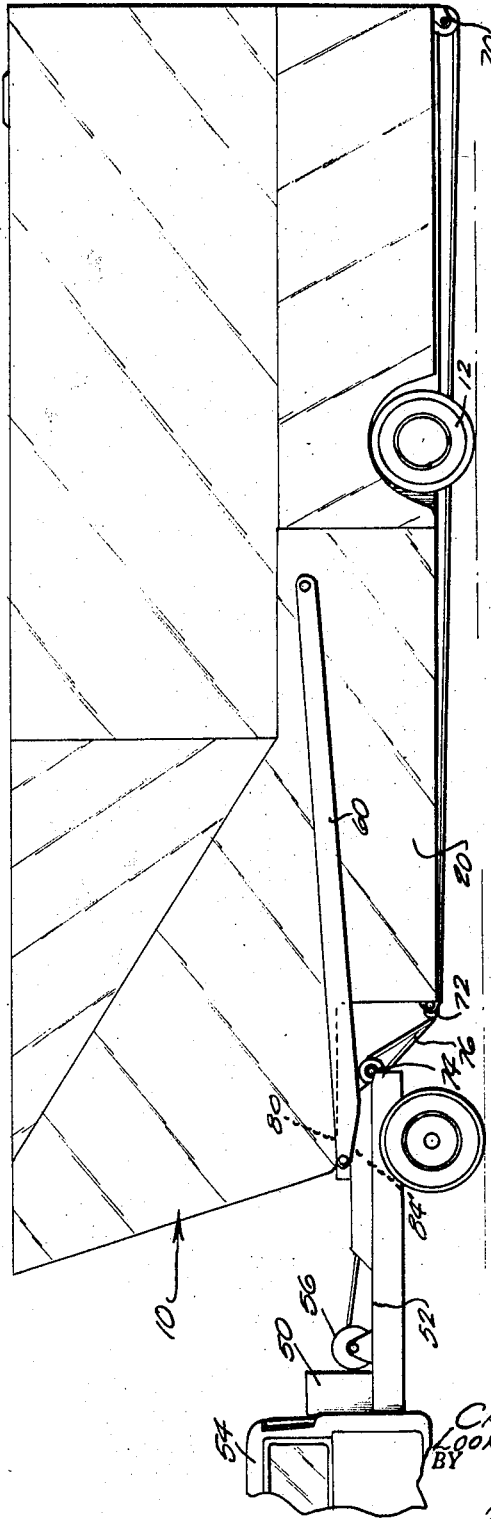

United States Patent Office 3,448,866
Patented June 10, 1969

3,448,866
PORTABLE CONCRETE BATCHER APPARATUS
Charles K. Perry and Looney F. Perry, Jr., both of 1405 N. Ave. F, Haskell, Tex. 79521
Filed Feb. 16, 1967, Ser. No. 616,572
Int. Cl. B65g 69/00
U.S. Cl. 214—2                     1 Claim

ABSTRACT OF THE DISCLOSURE

A portable concrete batcher apparatus in which there is a trailer frame supported from the ground by a pair of rotatable wheels, a rotatable pulley mounted from the underside of a rear end of said trailer frame, a guide pulley and a winch adapted to be mounted on a truck base plate, said frame engaging and further supporting from a fifth wheel mounted on a truck base plate, said winch and said guide pulley and said trailer frame pulley having a cable threaded through in which each end terminates on the truck, a pair of parallel push-arms pivotally connected between a fifth wheel support structure on said truck base plate and a respective corresponding point on said frame, and a motor driving said winch so that as the cable being threaded through said pulleys is coiled up on the winch, the trailer frame pulley is thereby drawn toward the truck to push the frame upright by said push-arms engaging said frame.

---

The present invention, therefore, is related to a trailer having concrete batching equipment thereon whereby large amounts of concrete may be batched on location, and in which there is provided on a trailer a combination of equipment pieces which will in turn do individual jobs in making a batch of concrete.

It is an object of the invention to provide a trailer frame supported by rotatable wheels and which may be readily erected to a position for producing large amounts of concrete that may be batched on location, and in which the portability, ease of operation and economy are provided.

A further object of the invention is to provide a trailer of such dimensions that it can be moved about and over highways without a need to obtain a special permit, and in which a minimum amount of equipment is needed for operating the batching apparatus.

A further object of the invention is to provide apparatus for manufacturing high quality concrete in which the apparatus is portable so that it is available in remote places. In places where electricity is not available, the machine is capable of being operated by a hydraulic system which, in turn, is driven by an internal combustion engine for developing its operational power.

Another object of the invention is to eliminate the problem of insufficient numbers of transit mixers so that concrete is manufactured on location without having an indeterminate number of transit mixers required for traversing distances to such locations. The portable concrete batcher may be set up on location, as desired.

The above and other objects and advantages of the invention will become apparent upon full consideration of the following detailed description and accompanying drawings in which:

FIG. 1 is a perspective view of the portable concrete batcher apparatus showing the preferred embodiment of the invention;

FIG. 2 is a further perspective view showing the opposite side thereof, also showing the portable concrete batcher apparatus in its erected position; and FIG. 3 is a side elevational view showing the portable concrete batcher apparatus being towed and in which the apparatus comprises a trailer mounted from the fifth wheel of a truck.

Referring now to the drawings, there is shown a trailer frame 10 which is identified as a portable concrete batcher apparatus including a pair of wheels 12, 12 for supporting the trailer frame when in the horizontal and non-erected position, as shown in FIG. 3, and in which are mounted on the trailer frame various cement or concrete batching materials.

The trailer frame is constructed of main corner beams 18, 18 and a bulk cement silo 20, a two-hundred gallon water tank 22, and aggregate weigh bin 24, a silo vent 26, a silo fill pipe 28, a silo valve 30, a cement weigh bin valve 34, a cement weigh bin and scales 36, a cement charging screw conveyor 40, a hydraulic motor 42 for driving the conveyor 40, weigh bin scales 44, hydraulic telescoping lift cylinders 48, 48, a hydraulic oil tank in FIG. 3 mounted on the truck base plate 52 of the truck 54 on a winch 56, and a pair of push-arms 60, 60 held in parallel position by stress support member 62 shown in FIG. 2.

A pulley 70 is mounted under the rear end of the trailer frame, a guide pulley 72, 74 being provided to extend and be supported from the trailer frame and the truck base plate, respectively, for guiding a cable 76 from a connection on the truck base plate 52, guide pulley 72 to the rear end pulley 70, and thence back to the pulley 74 and onto the winch 56 where it is wound.

A forward recessed end of the trailer frame 10 is provided with a trailer hitch connection 80 which engages a fifth wheel 82 of said truck 54, illustrated only in dotted lines in FIG. 3.

When the cement or portable concrete batcher apparatus on the trailer frame 10 arrives at a job location, the mechanical winch 56 is driven by its motor when the trailer frame is in the position shown in FIG. 3, so that upon force being exerted through the pair of parallel push-arms 60, 60, the trailer frame 10 is caused to be erected into its usable or functioning position, as illustrated in FIGS. 1 and 2. The motor that has energized the winch 56 may also be used to power the hydraulic pump for the hydraulic drive mechanism on the trailer frame 10, as has been described above. These in turn then drive the hydraulic cylinders 48, 48 and the motors, as may be selectively energized or operated. The hydraulic cylinders 48, 48 are seen to extend and to lift the lift aggregate bin 24, 24 off the scales and into the unloading position which is sufficiently high enough above the ground surface that concrete mixer trucks may be backed under to receive material from the gate of bin 24. The power also may be used to drive the cement screw conveyor 40 by its motor 42 to transfer cement from the weigh bin 36 to the concrete mixer truck, as desired. Water may also be mixed into the concrete mixer truck while the truck is in its position under the bin.

While the entire unit may be converted for being driven by electricity as the power source, the cost may be prohibitive and the hydraulic system is preferable since it is driven from the internal combustion engine of the truck 54. By the apparatus of the present invention, there is provided a portable batcher apparatus that can be easily assembled from a horizontal position to an erected position and moved from one location to the other, set up and put into operation very quickly and then lowered from the erected position to a horizontal trailer frame position, as shown in FIG. 3, by reversal of the operation described above for the erection operation. On the ends of the support frame of the trailer frame 10, there may be provided support feet 90, 90, 90.

By the apparatus of the present portable concrete or cement batcher apparatus, a concrete batch plant is designed to batch seven cubic yards approximately of concrete. By the same method, apparatus can be designed that can be used for smaller or larger batchers.

The concrete batch plant of the present invention is adapted by means of the structural features thereof to be set up in a method that takes only a few minutes, and can be efficiently operated from the power available with the necessary materials.

Additional embodiments of the invention in this specification will occur to others and therefore it is intended that the scope of the invention be limited only by the appended claims and not by the embodiment described hereinabove. Accordingly, reference should be made to the following claims in determining the full scope of the invention.

What is claimed is:

1. A portable concrete batcher comprising a trailer frame supported from the ground by a pair of wheels, a pulley mounted from the underside of the rear end of said frame, a guide pulley and a winch adapted to be mounted on a truck base plate, said frame engaging and further supported from a fifth wheel of said truck, said winch and said guide pulley and said trailer frame pulley having a cable threaded therethrough each end terminating on the truck, a pair of push-arms pivotally connected between a fifth wheel support structure and a point on said frame, a motor driving said winch so that as said cable is threaded thereon, the trailer frame pulley is drawn toward the truck to push the trailer frame upright to a vertical position by said push-arms engaging said frame, a bulk cement silo, a water tank, an aggregate weigh bin, said bulk cement silo, said water tank and said aggregate weigh bin being mounted on said trailer frame which travel on said frame in the horizontal and are adapted for work in the vertical positions, and scale equipment mounted on said trailer frame for dispensing cement aggregate to a mixer truck when said trailer frame is in a vertical position.

References Cited

UNITED STATES PATENTS

| | | | |
|---|---|---|---|
| 2,671,530 | 3/1954 | White | 52—119 X |
| 2,757,755 | 8/1956 | White | 52—119 X |
| 3,092,264 | 6/1963 | Milek | 214—2 |
| 3,090,501 | 5/1963 | Auld | 214—2 |
| 3,343,688 | 9/1967 | Ross | 214—2 |

ALBERT J. MAKAY, *Primary Examiner.*

U.S. Cl. X.R.

214—500